United States Patent [19]

Kiser

[11] Patent Number: 4,475,567

[45] Date of Patent: Oct. 9, 1984

[54] TURBO LUBRICATION SYSTEM

[76] Inventor: Robert W. Kiser, General Delivery, Kingshill, St. Croix, V.I. 00850

[21] Appl. No.: 417,623

[22] Filed: Sep. 13, 1982

Related U.S. Application Data

[62] Division of Ser. No. 166,244, Jul. 7, 1980, Pat. No. 4,363,214.

[51] Int. Cl.³ .................... G05D 11/00

[52] U.S. Cl. .................... 137/110; 137/572; 137/576

[58] Field of Search .................... 137/571, 572, 574, 576, 137/110

[56] References Cited

U.S. PATENT DOCUMENTS

| | | | |
|---|---|---|---|
| 845,804 | 3/1907 | Martin | 137/576 |
| 1,350,175 | 8/1920 | O'Connor | 137/576 |
| 1,419,145 | 6/1922 | Kleinberg | 137/576 |
| 1,435,001 | 11/1922 | Gilmore | 137/576 |
| 1,471,482 | 10/1923 | Goss et al. | 137/576 |
| 1,535,642 | 4/1925 | Armknecht | 137/576 |
| 1,570,010 | 1/1926 | Scowcroft, Jr. | 137/576 |
| 1,742,972 | 1/1930 | Sawyer | 137/576 |
| 1,990,604 | 2/1935 | Johnson | 137/576 |
| 2,161,060 | 6/1939 | Kelsey | 137/576 |
| 2,644,514 | 7/1953 | Potter | 137/576 |
| 2,788,801 | 4/1957 | Mowat | 137/576 |
| 2,818,915 | 1/1958 | Pfeiffer | 137/571 |
| 2,908,289 | 10/1959 | Everett | 137/576 |
| 2,945,509 | 7/1960 | Tuttle | 137/576 |
| 2,971,576 | 2/1961 | Anker | 137/571 |
| 2,991,911 | 7/1961 | Spain | 137/576 |
| 3,020,950 | 2/1962 | Schraivogel | 137/574 |
| 3,049,171 | 8/1962 | Neuerburg et al. | 137/574 |
| 3,638,676 | 2/1972 | Burch et al. | 137/576 |
| 4,136,693 | 1/1979 | Dyke | 137/576 |

FOREIGN PATENT DOCUMENTS

| | | | |
|---|---|---|---|
| 2847845 | 5/1979 | Fed. Rep. of Germany | 137/576 |

*Primary Examiner*—Alan Cohan
*Assistant Examiner*—John A. Rivell
*Attorney, Agent, or Firm*—Jerry A. Schulman

[57] ABSTRACT

A lubricating system for automotive components includes an oil reservoir to supply an initial charge of lubricating oil upon cold starting of the engine, with provision to maintain the reservoir in a full attitude after the engine lubricating oil has warmed and is freely circulating, thereby preserving a charge of oil available for the next cold starting of the engine.

11 Claims, 4 Drawing Figures

TURBO LUBRICATION SYSTEM

This is a division of application Ser. No. 166,244 filed July 7, 1980, which has issued as U.S. Pat. No. 4,363,214 on Dec. 14, 1982.

BACKGROUND OF THE INVENTION

This invention relates to lubricating systems for automotive components and, more particularly, to a device whereby the turbo charger on a diesel-type truck engine may be lubricated from a cold start.

Diesel-fuel internal combustion automotive engines differ from gasoline engines in several major respects. Power is created in a gasoline-fueled internal combustion engine by vaporizing the gasoline, mixing it with air, and igniting the resulting mixture within a cylinder of the engine. The expanding gases from ignition force a piston within the cylinder downward to turn a crankshaft which, in turn, eventually drives the wheels of the vehicle. The mixing of gasoline with air is performed in the carburetor of the gasoline engine.

Air needed for combustion in diesel engines enters the engine by way of a turbo fan unit, commonly known as a turbo charger, which draws air in through an inlet and directs it to the engine, and ignition of the fuel occurs when the fuel-air mix is compressed within the cylinder. One such unit is manufactured by AiResearch, as model T12.

During operation, the compressor in the turbo unit rotates at high speeds of up to 120,000 r.p.m. and it has been found that the use of ordinary bearings on the compressor shaft is not feasible at such speeds. Accordingly, the compressor shaft is rotatably supported in aluminum bushings. Lubrication of the turbo unit during operation is critical to efficient operation and prevention of breakdowns caused by excessive wear of the aluminum bushings.

Present lubrication systems provide an oil take-off, most commonly from the oil filter of the vehicle, whereby oil circulating through the engine block is directed to the turbo via an oil conduit. Such a system does not provide efficient lubrication of the turbo unit when the engine is first started and the flow of oil is not yet established, or when the engine is used for prolonged periods of time in extremely cold temperatures, such as commonly incurred when making runs through mountainous areas. Under conditions of extreme cold, motor oil thickens, and it is often as long as three minutes after the engine has been started before the oil is warmed enough to reach the turbo unit.

The current trend toward smaller automobile engines has increased the desirability for use of turbo units on cars as well as trucks. Turbo units provide a way for such engines to operate with increased power under heavier loads by providing more fuel mixture to the engine.

The need exists, therefore, for an engine component lubricating system which provides an initial charge of lubricating oil upon starting of a cold engine, independent of the operation of the engine's oil pump. Means should also be provided to replenish the oil charge during normal operation of the engine when the engine's own lubrication system will provide lubrication for the component part involved. As herein contemplated, one such component is the turbo charging unit commonly found on diesel engines for trucks and the like.

Accordingly, the present invention has the following objects:

To provide turbo lubricating systems for turbo-equipped internal combustion engines which operate from a cold start;

To provide such systems in forms readily adaptable for installation on existing engines;

To provide such systems in forms utilizing a minimum of moving parts and operating hardware;

To provide such systems in forms which are self-priming;

To provide such systems in forms which provide lubricating oil for starting and which thereafter may be substantially bypassed during normal operation;

To provide such systems in forms providing for the preheating of lubricating oil; and To provide such systems in forms which are simple and economical to manufacture, install and maintain.

BRIEF DESCRIPTION OF THE DRAWINGS

The foregoing objects may be better understood, and further objects will become more apparent upon a consideration of the accompanying drawings in which.

BRIEF DESCRIPTION OF THE INVENTION

An enclosed vessel has an oil inlet directed thereto from the vehicle engine, with oil being passed therealong by action of the vehicle's oil pump. A second vessel, contained within the first, provides a terminus for the oil inlet. The inner vessel has a selectively openable outlet positioned at its bottom, and a series of overflow ports positioned proximate its top.

The outer vessel has an oil outlet positioned at its bottom, directing oil to a conduit leading to the turbo unit to be lubricated. Lubricating oil reaches the outer vessel outlet in two manners. During normal running of the engine, inlet oil fills the inner vessel to overflowing, whereby oil enters the outer vessel via the overflow ports. Such oil then drains to the outer vessel outlet and is directed to the turbo unit.

Under cold starting conditions, where the flow of oil from the vehicle engine has not yet been established, oil is provided to the outer vessel outlet by draining the oil retained in the inner vessel, via the inner vessel outlet port. The opening or closing of the inner vessel outlet port is controlled by a solenoid which may be operated responsive to the operating temperature of the engine such that when the engine is cold, the outlet port will open and when the engine reaches normal operating condition, the outlet port will be closed.

DETAILED DESCRIPTION OF THE DRAWINGS

Figure 1:
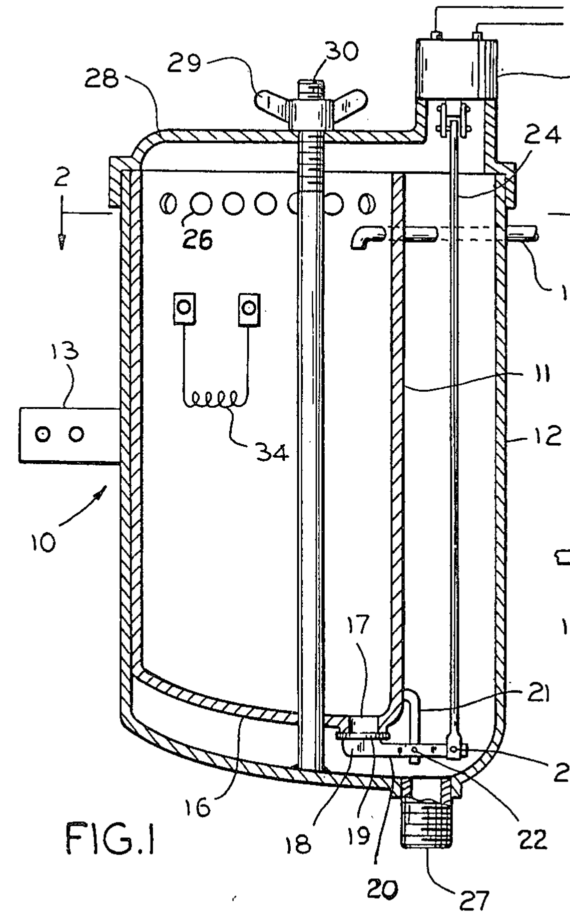
FIG. 1 is a side sectional view of the lubricating system.

Referring now to FIG. 1, the numeral 10 indicates generally a turbo lubrication unit having an inner holding vessel 11 and an outer jacket 12. Bracket 13 provides a convenient means whereby unit 10 may be mounted in the engine compartment of a vehicle.

Figure 2:
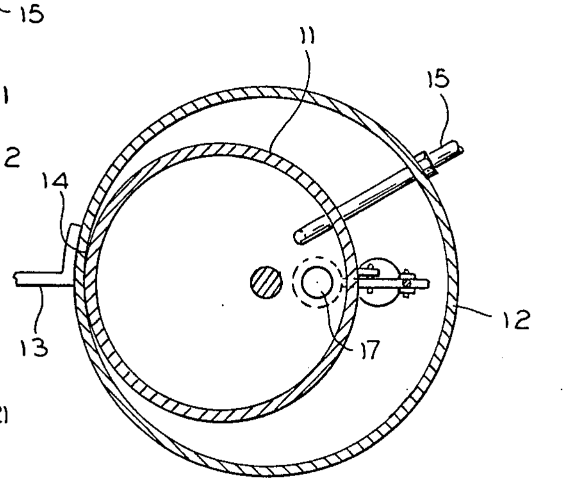
FIG. 2 is a view along 2—2 of FIG. 1.
Figure 3:
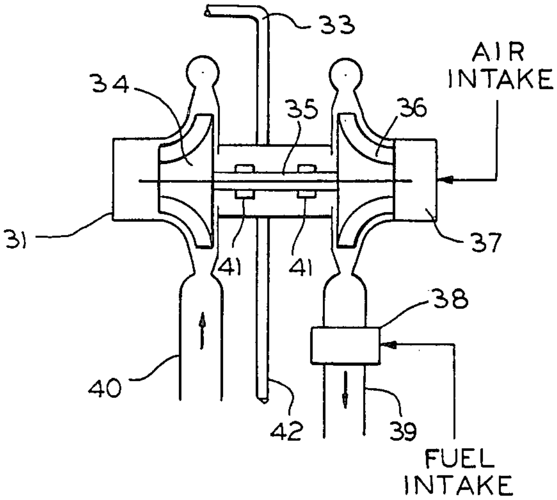
FIG. 3 is a schematic cross-sectional view of a turbo charger unit.

As best seen in FIG. 2, holding vessel 11 may be mounted in a preferred embodiment to the inner wall of jacket 12 as shown at 14, by welding or otherwise.

Oil line 15 extends through the wall of jacket 12 and through the wall of holding vessel 11 to extend into holding vessel 11 as best shown in FIG. 2. Oil line 15 may preferably extend from a take-off on the vehicle's oil filter. The vehicle's oil pump will thereby provide a flow of filtered engine oil to holding vessel 11.

At its lowermost, holding vessel 11 is closed off by vessel floor 16 which may be sloped so that holding vessel 11 has a lowermost point at which vessel outlet 17 may be formed. In like fashion, the floor of outer jacket 12 may be similarly sloped.

In a preferred embodiment, vessel outlet 17 may be selectively closed off by valve assembly 18. As illustrated in FIG. 1, valve assembly 18 includes a valve plate 19 mounted to one end of a rocker arm 20. Bracket 21 rotatably supports rocker arm 20 at pivot 22, and outlet 17 is thereby opened when rocker arm 20 is rotated in a counter-clockwise direction and closed when rotated in a clockwise direction.

To effect such rotation of rocker arm 20, solenoid 23 is provided, mounted to the lid of unit 10 as shown in FIG. 1. Control shaft 24 extends from solenoid 23 to rocker arm 20, and is pivotally attached to rocker arm 20 at control pivot 25. Thus, in an extended position, shaft 24 holds valve plate 19 against outlet 17 to thereby close off said outlet. When solenoid 23 is energized, shaft 24 is drawn upward to rotate rocker arm 20 about pivot 22, thereby opening outlet 17. To assist in maintaining a sufficient seal, rocker arm 20 may be spring-biased to urge it into a normally closed attitude, and solenoid 23 will then be selected to be of sufficient strength to defeat said spring (not herein illustrated) when it is desired to open outlet 17.

As seen in FIG. 1, holding vessel 11 has a series of overflow ports 26 formed about a portion of its upper periphery. Said ports 26 provide an outlet for engine oil in holding vessel 11 as the level of oil in holding vessel 11 rises. This will occur during normal operation of the vehicle when outlet 17 is closed and oil is pumped by the vehicle's oil pump to unit 10.

Jacket 12 has outlet 27 formed at the lowermost part of its bottom to provide an exit point for the lubricating oil, and it is contemplated that additional tubing may be attached to said jacket outlet 27 to direct oil from unit 10 to the turbo unit, as needed.

Unit 10 is also provided with a lid 28 which is maintained tightly by wing nut 29 screwed down on shaft 30. Such an arrangement is necessary because the oil circulating system in the vehicles for which unit 10 is designed is a pressurized system, often reaching operating pressures of 80 psi, and oil will be lost through unit 10 unless said unit is sealed. Use of wing nut 29 provides a convenient means for opening unit 10 for purposes of installation, inspection, or maintenance.

Figure 4:
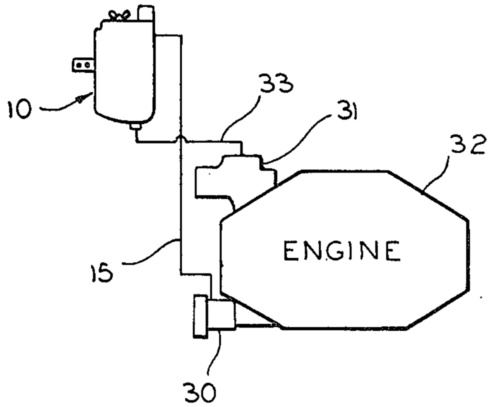
FIG. 4 is a schematic view of the system of FIGS. 1 and 2 as installed.

Operation of the preferred embodiment hereinabove described, and shown in FIGS. 1 and 4, is as follows. Lubricating oil is pumped to holding vessel 11 via oil line 15 from oil filter 30. During such pumping holding vessel outlet 17 is closed off by valve assembly 18.

As shown generally in FIG. 4, turbo unit 31 has an impeller 34 mounted to one end of shaft 35, with compressor 36 mounted to the other end thereof. In the particular example selected, compressor 36 draws in air via air intake 37, mixes it with fuel via fuel intake 38, and "blows" the resulting mixture to the intake side 39 of engine 32.

In the particular arrangement shown, impeller 34 is positioned on the exhaust side 40 of engine 32, and is driven by exhaust gases passing therethrough, thereby driving compressor 36. In other turbo units, impeller 36 may be driven by direct mechanical coupling to the engine, as found desirable.

Shaft 35 is mounted in bushings 41 which, consistent with the foregoing, require lubrication for efficient operation.

During operation of engine 32, the level of oil within holding vessel 11 reaches overflow ports 26, and oil flows from holding vessel 11 into jacket 12, and exits jacket 12 via jacket outlet 27, thereby reaching bushings 41 in the vehicle's turbo unit 31, via oil line 33, and may be returned to engine 32 via oil return line 42.

When the vehicle's engine 32 is shut off, the flow of oil to holding vessel 11 ceases, and holding vessel 11 remains filled with oil up to overflow ports 26.

Upon subsequent restarting of the now-cold vehicle engine, solenoid 23 is energized, responsive to the low temperature of the engine block or engine coolant, and holding vessel outlet 17 is thereby opened, thus draining oil into jacket 12 and, via outlet 27 to the vechicle's turbo unit 31. In this manner, lubricating oil is made available to turbo unit 31 upon first operation of vehicle engine 32. Valve assembly 18 will remain in an open position until a selected engine characteristic is reached such as engine temperature, at which point solenoid 23 will de-energize allowing valve assembly 18 to return to a closed position. Oil will then fill and overflow holding vessel 11 to reach turbo unit 31.

Other features which may be incorporated into the foregoing described unit include an electrical heater 34, shown schematically in FIG. 1, positioned within holding vessel 11 to provide for the heating of lubricating oil retained therein so that the oil will more readily flow when ambient temperatures are extremely low and the vehicle engine has been sitting idle. Such heater may be energized either by an external source of voltage, or by a supply of voltage drawn from the vehicle's own battery. Safeguards and circuits to guard against excess battery drain are well known, may be employed with said heater, and it is unnecessary to detail them here.

The rate at which oil flows into the jacket 12 from the holding vessel 11 may be controlled by the number and size of the overflow ports fashioned in the holding vessel 11. As an additional safety feature, the top of holding vessel 11 may be left open so that, should the ports for any reason become blocked, oil pressure will not build up in the holding vessel 11, but instead will be released to the jacket 12.

Control of the energizing of solenoid 23 may be accomplished in a number of well known manners, such as by thermally controlled relays which will operate responsive to engine block temperature, engine oil temperature, exhaust manifold temperature, or engine coolant temperature, or by pressure-responsive mechanisms which may be activated by the vehicle's oil pressure. Provision may also be made to manually engage and disengage solenoid 23 by the vehicle's driver.

Use of the above-described device is not limited to diesel engines, but may be adapted to any vehicle engine with an engine component requiring lubrication upon initial startup.

While the foregoing has been described in terms of a preferred embodiment, it is to be understood that the foregoing has been presented by way of example only. It is anticipated that others skilled in the art may perceive variation which, while differing from the foregoing, do not depart from the spirit and scope of the invention as herein described and claimed.

What is claimed is:

1. Apparatus for storing and dispensing liquid in a closed, pressurized flow system having an operating mode and a non-operating mode, said apparatus comprising:

an outer pressure-tight vessel;

an inner vessel having an outlet formed thereon; said operating mode being characterized by a constant flow of said liquid from said outer vessel to said inner vessel via said system;

said inner vessel smaller than and positioned within said outer vessel;

means for directing said liquid to said inner vessel during said operating mode;

means for pouring said liquid from said inner vessel to said outer vessel during said operating mode;

means for retaining a charge of said liquid within said inner vessel when said operating mode ceases; and means for draining said charge to reach said outlet of said vessel automatically in response to commencement of said operating mode.

2. The apparatus as recited in claim 1 wherein said drain means includes an outlet formed on said inner vessel; and means for opening said outlet when said operating mode commences.

3. The apparatus as recited in claim 2 wherein said opening means includes a solenoid-actuated valve means.

4. The apparatus as recited in claim 1 wherein said pouring means includes a series of overflow ports fashioned in said inner vessel whereby liquid rising to the level of said ports exits said inner vessel into said outer vessel.

5. The apparatus as recited in claim 1 wherein said outlet is positioned at the bottom of said outer vessel.

6. The apparatus as recited in claim 2 wherein said drain means is positioned at the bottom of said inner vessel.

7. The apparatus as recited in claim 1 wherein said outer vessel has a removable lid attachable pressure-tightly thereto.

8. Apparatus for storing and dispensing liquid in a closed pressurized flow system having an operating mode and a non-operating mode, said apparatus comprising:

an outer vessel having a lid, said lid fitted pressure-tightly to said outer vessel;

an inner vessel smaller than and positioned within said outer vessel;

said operating mode being characterized by a constant flow of said fluid from said outer vessel to said inner vessel via said system;

said inner vessel being spaced apart from said outer vessel about a substantial portion of the periphery of said inner vessel;

means for directing a flow of said liquid to said inner vessel during said operating mode;

means for establishing a flow of said liquid from said inner vessel to said outer vessel means for retaining a charge of said liquid in said inner vessel;

means for draining the contents of said innervessel to said outer vessel automatically at the commencement of said operating mode; and means for conducting the flow of said liquid from said outer vessel to a desired point of delivery for said liquid during said operating mode.

9. The apparatus as recited in claim 8 wherein said inner vessel retaining means includes a valve mechanism for selectively operating said retaining means.

10. The apparatus as recited in claim 9 wherein said valve mechanism is solenoid-operated.

11. The apparatus as recited in claim 10 wherein said solenoid is positioned in said lid.

* * * * *